United States Patent [19]
Bauer

[11] Patent Number: 4,795,004
[45] Date of Patent: Jan. 3, 1989

[54] SAFETY BRAKE SYSTEM FOR A MOTOR VEHICLE

[76] Inventor: John K. Bauer, 510 Lenox Ave., Miami Beach, Fla. 33139

[21] Appl. No.: 74,230

[22] Filed: Jul. 16, 1987

[51] Int. Cl.$^4$ ............................................. F16D 65/14
[52] U.S. Cl. ........................... 188/106 P; 188/106 A; 188/106 F; 188/345
[58] Field of Search .............. 303/6 R, 6 A, 6 C, 113; 188/106 P, 106 F, 106 A, 20, 345, 71.1, 73.39

[56] References Cited

U.S. PATENT DOCUMENTS

| | | | |
|---|---|---|---|
| 3,477,549 | 11/1969 | Barton | 188/106 P |
| 3,478,847 | 11/1969 | Bender et al. | 188/106 P |
| 3,949,846 | 4/1976 | Hayashida | 188/106 P |
| 3,999,807 | 12/1976 | Haraikawa | 303/6 R |
| 4,611,693 | 9/1986 | Wang | 188/73.39 |

FOREIGN PATENT DOCUMENTS

| | | | |
|---|---|---|---|
| 1137330 | 9/1962 | Fed. Rep. of Germany | 188/106 P |
| 616167 | 1/1961 | Italy | 188/106 P |

Primary Examiner—Andres Kashnikow
Assistant Examiner—Mark T. Le
Attorney, Agent, or Firm—Thomas Schneck

[57] ABSTRACT

A brake system for a motor vehicle having three sources of communicating pressurized fluid to wheel brakes and having a mechanical brake. Two of the sources of communicating pressurized fluid are the reservoirs of a dual master cylinder and provide first and second hydraulic brake subsystems. The remaining source is an emergency master cylinder and provides a third hydraulic brake subsystem. The mechanical brake and the third hydraulic brake subsystem are operatively connected to an emergency brake pedal. Disc brakes each have a pair of floating calipers, each caliper being in fluid communication with a pair of sources of communicating pressurized fluid. Drum brakes have at least one dual chambered wheel cylinder in fluid communication with two sources of communicating pressurized fluid. The first and second hydraulic brake systems, as well as the emergency brake pedal, operate brakes on each of the four wheels of a motor vehicle.

10 Claims, 2 Drawing Sheets

SAFETY BRAKE SYSTEM FOR A MOTOR VEHICLE

DESCRIPTION

TECHNICAL FIELD

The present invention relates to braking systems for motor vehicles.

BACKGROUND ART

In a vehicle brake system, applying a footbrake provides a hydraulic pressure in a master cylinder and the hydraulic pressure is transmitted through brake lines to wheel brakes. Front wheel brakes are typically of the rotating disc and static caliper type, while the rear wheel brakes are often of the drum type. Both disc brakes and drum brakes operate by application of hydraulic pressure to pistons which force friction members into contact with rotating members.

Obviously, a malfunction in transmitting hydraulic pressure to the wheel brakes will create problems. For example, leakage of fluid will cause depression of a brake pedal to become spongy, and excessive leakage will render the brake system inoperable. Air or contamination in the brake fluid will cause similar results. Thus, it is known to provide a dual master cylinder having one chamber for supply of hydraulic pressure to two wheel brakes and having a separate chamber for supply of hydraulic pressure to the other two wheel brakes. Generally, the first chamber operates the front disc brakes and the second chamber operates the back drum brakes, but criss-cross systems are in use. A dual master cylinder brake system includes a combination valve which functions to control the hydraulic pressure from the second chamber, relative to the pressure from the first chamber.

The dual master cylinder establishes a backup brake subsystem, since should one subsystem fail, the other will continue to operate to brake the car. A single subsystem, however, only has approximately sixty percent of the braking power of a properly functioning dual master cylinder braking system. Additionally, both subsystems have a number of mechanical parts in common, from the brake pedal and its linkage, through the master cylinder and the combination valve. Thus, failure of one of these mechanical parts could render the entire brake system inoperable.

Should either a single or a dual master cylinder brake system fail, the only remaining braking power lies in application of the emergency brake. The emergency brake, however, is a mechanical brake, with only approximately ten percent of braking ability of a hydraulic system. Thus, the conventional emergency brake functions best as a parking brake, rather than a means of stopping a moving vehicle.

It is an object of the present invention to provide a dual master cylinder hydraulic system which does not lose a substantial amount of braking power should one subsystem fail and, further, to provide such a system with an emergency brake system which is functional in braking a speeding vehicle.

DISCLOSURE OF THE INVENTION

The above object has been met by a motor vehicle brake system which leaves ninety to ninety-five percent of the braking power provided by a dual master cylinder even if one of the subsystems fails and, moreover, furnishes approximately seventy percent of that braking power even if both subsystems fail. The seventy percent is possible since in addition to a mechanical brake, the emergency foot pedal (or hand control) is linked to a second master cylinder. Thus, the present invention includes three sources of communicating pressurized fluid to wheel brakes, the first and second sources being the dual master cylinder and the third source being the emergency master cylinder.

In the present system wherein disc brakes are fitted to the front wheels and drum brakes are on the rear wheels, each wheel brake has at least one hydraulic response unit, either a caliper or a wheel cylinder. The front wheels each have a pair of calipers, rather than the single caliper found on conventional disc brakes. The first source of pressurized fluid is a hydraulic fluid reservoir in the dual master cylinder and is linked to each of the four calipers, as well as wheel cylinders of the rear drum brakes. The second source is also a hydraulic fluid reservoir in the dual master cylinder and is linked to a single caliper of each front brake and to the wheel cylinders of the rear brakes. The calipers not in fluid communication with the second source are linked to the third source which is controlled by the emergency foot pedal. The emergency foot pedal also controls the mechanical brake to each rear wheel.

The four calipers of the front brakes are each floating calipers. Proper operation of either source of fluid to a caliper will cause pistons to pinch the rotor between the friction pads of the disc brake. Similarly, the drum brakes are of the duo-servo type so that fluid from either or both of the first and second sources of pressurized fluid will operate the rear brakes. Thus, the first and second sources of pressurized fluid are both linked to each of the four wheels. Furthermore, the emergency foot pedal is also linked to all four wheels since the foot pedal controls the source of fluid to two calipers and controls the rear mechanical brakes.

An advantage of the present invention is that it provides a more balanced system even after a malfunction of one, or even two, sources or braking fluid. Another advantage is that only a relatively small amount of braking power is lost by a malfunction of one of the dual lines from the dual master cylinder. A third advantage is that the emergency foot pedal is functional in bringing a moving vehicle to a quick stop, so that the foot pedal is indeed an emergency brake, rather than a parking brake.

BEST MODE FOR CARRYING OUT THE INVENTION

Figure 1:
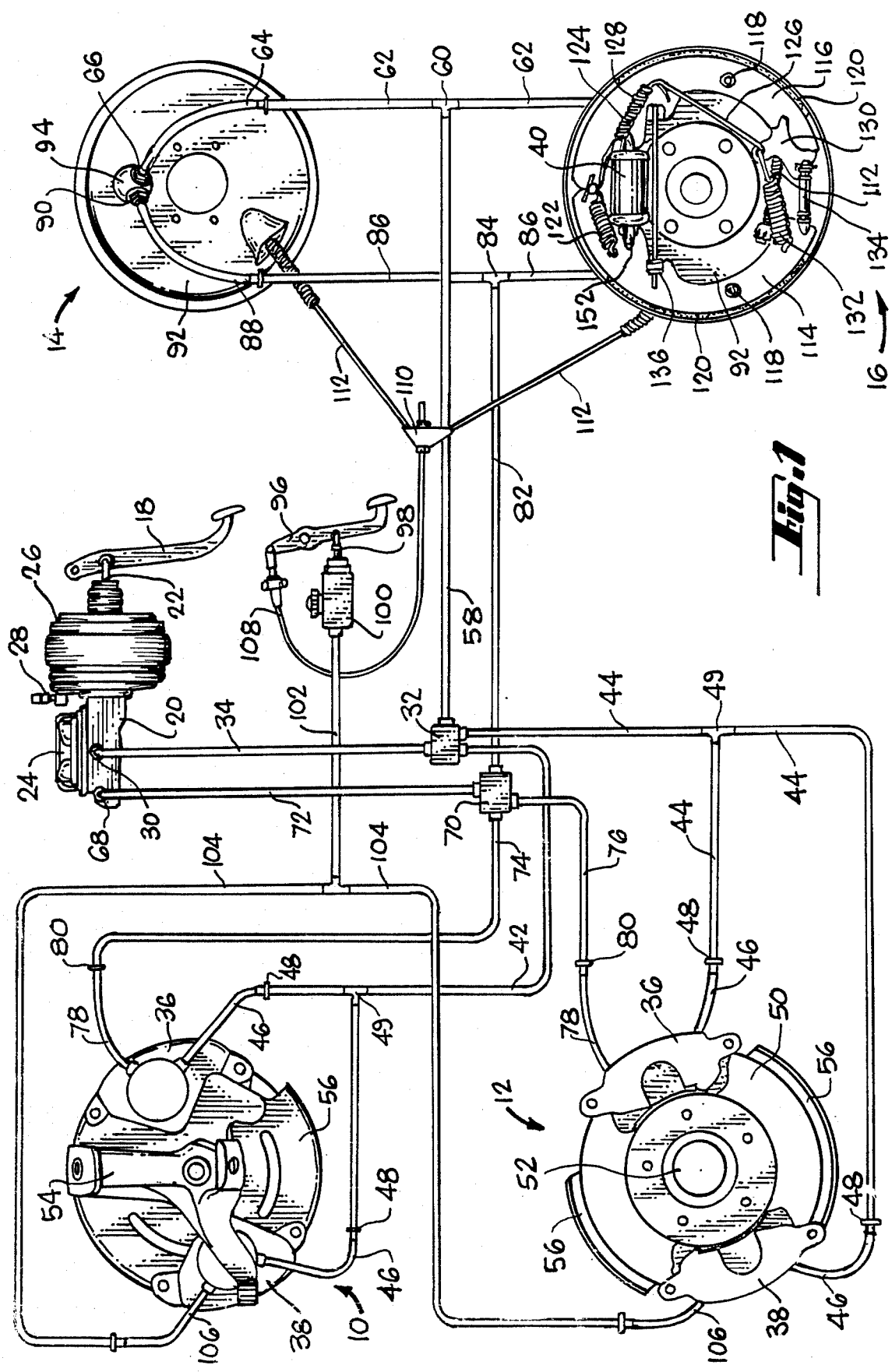
FIG. 1 is a plan view of a brake system in accord with the present invention.

Referring to FIG. 1, a brake system is shown having right and left front disc brakes 10 and 12 and having right and left rear drum brakes 14 and 16. Flow of hydraulic fluid to the front and rear brakes 10-16 is primarily controlled by movement of a brake pedal 18.

The brake pedal 18 is linked to a dual master cylinder 20 by a push rod 22. The dual master cylinder 20 is of the conventional type, having a cover plate 24 which protects a first and a second hydraulic fluid reservoir. A brake booster 26 utilizes atmospheric pressures and intake manifold vacuum through vacuum hose 28 to reduce braking effort and brake pedal travel.

A first master cylinder outlet 30 is in fluid communication with a junction block 32 by means of a first reservoir outlet brake line 34. Preferably, the junction block 32 operates in the same manner as a combination valve, regulating the hydraulic pressure to the brakes 10–16 to provide balanced braking, thereby guarding against premature lock-up of one brake.

Hydraulic fluid associated with the junction block 32 controls a first brake subsystem, which includes a pair of calipers 36 and 38 on each front disc brake 10 and 12 and a wheel cylinder 40 in each rear drum brake 14 and 16. The junction block 32 is in fluid communication with the calipers via right and left caliper brake lines 42 and 44 which attach to brake hoses 46 at fittings 48 after branching at junction couplings 49. As will be shown more fully below, the disc are of an opposed pistons floating-caliper type so that hydraulic fluid pressure will push friction pads into contact with a rotating disc 50 to brake a motor vehicle. The disc 50 is mounted to the wheel hub 52 for rotation therewith. The calipers 36 and 38, conversely, are secured to the motor vehicle by a steering knuckle/caliper anchor plate 54 which does not rotate. A splash shield 56 protects against excessive moisture on the rotating disc 50.

A first subsystem drum brake line 58 permits fluid passage to a junction coupling 60 which branches off hydraulic fluid to the rear brakes 14 and 16. Extension brake lines 62 are linked to brake hoses 64 which, in turn, are fixed to wheel cylinders 40 by a fixed-nut-and-washer arrangement 66.

A second master cylinder outlet 68 supplies hydraulic fluid for a second brake subsystem that includes a junction block 70 which channels fluid to each front disc brake 10 and 12 and the wheel cylinders 40 of the rear drum brakes 14 and 16. Again, the junction block 70 preferably functions as a combination valve. Hydraulic fluid enters the junction block 70 through reservoir outlet brake line 72 and is channeled to the calipers via right and left brakes lines 74 and 76. As in the first subsystem, the brake lines 74 and 76 are linked to brake hoses 78 by fittings 80. The wheel cylinders 40 are likewise joined to the junction block 70 in the same manner as the wheel cylinders are connected to the junction block 32 of the first subsystem. A second subsystem drum brake line 82 attaches to a junction coupling 84 that branches fluid to extension brake lines 86. The extension brake lines 86 provide hydraulic fluid to brake hoses 88 which are coupled to the wheel cylinders 40 by a fixed-nut-and-washer arrangement 90. The backing plate 92 of each rear drum brake 14 and 16 includes a bore 94 for passage of the brake hoses 64 and 88 to the wheel cylinder 40.

An emergency brake pedal 96, in addition to actuating a conventional mechanical brake, controls a third brake subsystem. Displacement of the brake pedal 96 moves a push rod 98 of a single reservoir master cylinder 100. The master cylinder 100 feeds hydraulic fluid to the forward calipers 38 of the front disc brakes 10 and 12 via brake lines 102 and 104 and brake hoses 106.

The mechanical brake comprises a fourth brake subsystem. The emergency brake pedal 96 is mechanically connected to a front brake cable 108 which, as is well known in the art, engages an equalizer 110. Rear brake cables 112 extend from the equalizer 110 to provide braking tension to the rear drum brakes 14 and 16. The emergency brake pedal 96 includes a mechanism, not shown, for releasably retaining the pedal in a depressed position so as to provide prolonged braking tension.

Each rear drum brake 14 and 16 includes a primary shoe 114 and a secondary shoe 116. Shoe holddown springs 118 fix the shoes 114 and 116 in position. Brake linings 120 are mounted to each shoe for frictional contact with a brake drum, not shown. The drum brakes include a primary shoe return spring 122, a secondary shoe return spring 124, and a self-adjusting assembly comprising an adjuster cable 126, a cable guide 128, an adjuster lever 130, and an adjuster lever spring 132. A mechanical adjusting member 134 is provided for initial set-up.

Figure 2:
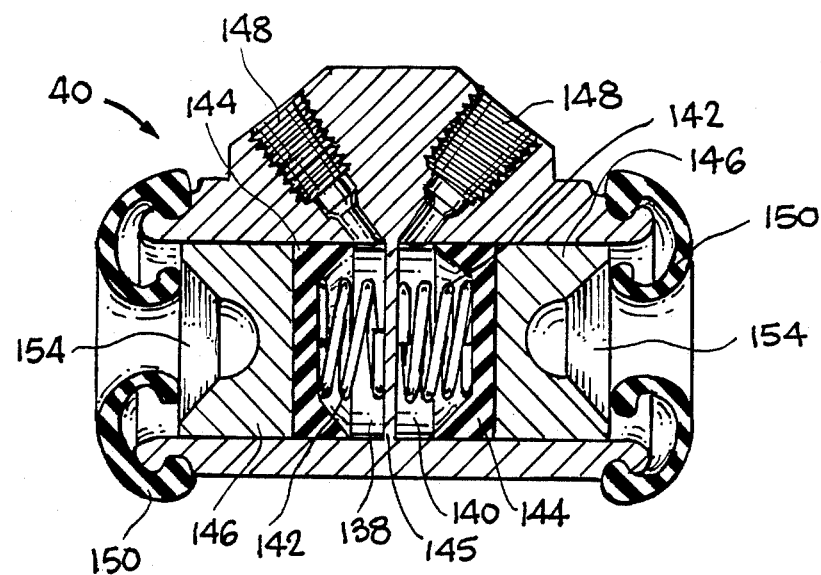
FIG. 2 is a side sectional view of a wheel cylinder of FIG. 1.

The primary and secondary shoes 114 and 116 will push the brake linings 120 into frictional contact with a brake drum only after the bias of return springs 122 and 124 is overcome. Mechanically, this is done by transmission of a tensioning force from the emergency rear brake cable 112 to move the emergency brake strut 136. Hydraulically, the shoes 114 and 116 are moved by the wheel cylinder 40. In a conventional wheel cylinder, hydraulic fluid is applied to a central chamber in a wheel cylinder to transfer the master cylinder pressure to wheel cylinder pistons which drive the brake shoes. FIG. 2 illustrates a wheel cylinder 40 of the present invention. The wheel cylinder includes opposed chambers 138 and 140, each having a tensioning spring 142 which biases a cup member 144. A wall 145 separates the chambers 138 and 140. Pistons 146 are forced outwardly by hydraulic pressure entering inlets 148. An annular dust boot 150 protects each piston 146 from contamination.

Referring to FIGS. 1 and 2, the brake hoses 64 and 88 of the first and second brake subsystem are each attached to an inlet 148 of the wheel cylinders 40. Link members 152 fit within seats 154 of each wheel cylinders and include slots, not shown, which receive an associated brake shoe 114 or 116. Displacement of a piston 146 will, therefore, move the associated brake shoe either toward or away from a brake drum. As noted above, the rear drum brakes 14 and 16 are of the duo-servo type. Thus, movement of a shoe will apply a reactive force to the opposite shoe to bring both brake linings 120 into frictional contact with the brake drum. As a consequence, proper operation of either the first or the second brake subsystem will provide braking power to the rear drum brakes.

Figure 3:
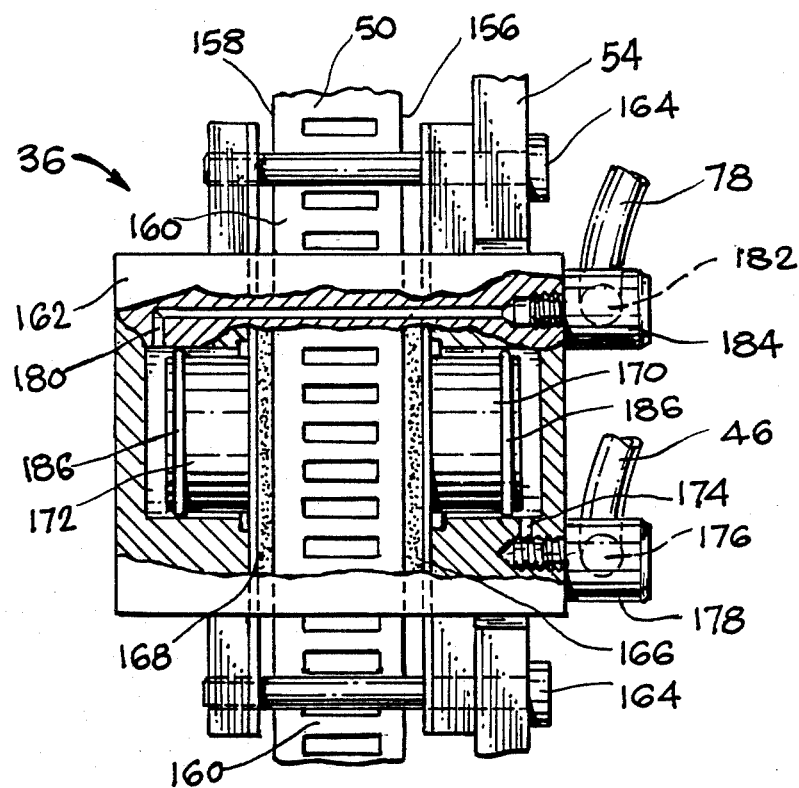
FIG. 3 is a front partially cut away view of a caliper of FIG. 1.

Moreover, proper operation of any of the three hydraulic subsystems will provide braking power to the front disc brakes 10 and 12. Referring now to FIGS. 1 and 3, the disc brakes 10 and 12 are opposed pistons floating-caliper brakes. FIG. 3 illustrates a back caliper 36 but the front caliper 38 has a substantially identical construction. The rotating disc 50 includes inboard and outboard frictional surfaces 156 and 158 and includes a series of air vent louvers 160 to permit cooling of the surfaces. The caliper 36 has a housing 162 which is fixed to the steering knuckle/caliper anchor plate 54 by locating pins 164. Inboard 166 and outboard 168 brake shoes straddle the rotating disc 50. The brake shoes 166 and 168 comprise asbestos friction pads secured to metal plates. Pistons 170 and 172 contact the brake shoes to selectively urge the brake shoes into frictional engagement with the rotating disc 50. The inboard piston 170 is in fluid communication with the first brake subsystem via a housing passageway 174 and a bore 176 through bolt 178 to the brake hose 46. Similarly, the outboard piston 172 communicates with the second brake subsystem by means of a housing passageway 180 and a bore 182 in bolt 184. Piston seals 186 protect against leakage. Hydraulic pressure from the master cylinder 20 will cause the pistons 170 and 172 to urge the brake shoes 166 and 168 into contact with the rotating disc 50. Because the caliper is a floating caliper, when one brake shoe is pushed hydraulically into contact with the rotating disc 50, reactive force thus generated will pull the opposite shoe into frictional engagement with the disc. That is, since the caliper is allowed to float slightly along the axle centerline, proper operation of either brake subsystem to a caliper 36 and 38 will cause engagement of both brake shoes 164 and 166 against the rotating disc.

In operation, engagement of the brake pedal 18 manipulates both the first and the second brake subsystem, either of which activate brakes on all four wheels of a motor vehicle. Likewise, engagement of the emergency brake pedal 96 activates brakes associated with each of the four wheels.

The first brake subsystem may independently operate the four flooding calipers 36 and 38 of the front disc brakes 10 and 12, and operate the two wheel cylinders 40 of the rear drum brakes 4 and 16. Hydraulic pressure is transmitted from the outlet 30 of the dual master cylinder 20. Pressure to the rear of the inboard caliper pistons 170 causes engagement of the brake shoes 166 and 168 against the rotating disc 50. At the rear brakes, hydraulic pressure at the rear of piston 146 pushes one brake shoe 114 or 116 against a brake drum and the reactive force brings the opposite brake shoe against the brake drum.

The second brake subsystem works in the same manner, through transmission of hydraulic pressure from master cylinder outlet 68. The second subsystem is linked to the wheel cylinders 40 and to only two of the four floating calipers 36.

Displacement of the emergency brake pedal 96 hydraulically operates the two calipers 38 not linked to the second brake subsystem and also applies the mechanical brake assembly of the rear drum brakes 14 and 16. Thus, in contrast to conventional emergency brakes, a speeding vehicle may be brought to a quick halt by depression of the emergency brake pedal 96.

In a conventional brake system having front disc brakes and rear drum brakes, up to 60% of the braking horsepower of a completely functioning brake system is lost if a subsystem fails, since failure of a subsystem leaves braking horsepower comparable to that of the hydraulic subsystem associated with the emergency master cylinder 100. Failure of the first brake system of the present invention, in comparison, leaves approximately 90% of normal braking horsepower, in addition to the braking capability of the emergency brake. Even less is lost by failure of the second brake subsystem, rather than the first. Because of the presence of a double caliper disc brake and a dual chambered drum brake wheel cylinder, little is lost by the failure of a single subsystem. Additionally, during parking on an incline, the hydraulic and mechanical subsystems associated with the emergency brake combine to provide 70% of what is normal braking power, rather than merely the 10% produced by a mechanical subsystem alone.

While the present invention has been illustrated showing front disc brakes and rear drum brakes, it is to be understood that the present invention is not limited to the drawings. For example, the rear drum brakes may be disc brakes that are in fluid communication with the first and second hydraulic subsystems. Or, for example, the emergency brake pedal 96 may be replaced with a handbrake lever.

We claim:

1. A brake system for a vehicle having a plurality of hydraulic wheel brakes, each hydraulic wheel brake having a rotating member and at least one hydraulic response unit for retarding the motion of the rotating member, comprising, first and second manually operated brake actuators, a first master cylinder having first and second hydraulic means for affecting pressure upon a fluid working medium, said first master cylinder being operatively connected to said first manually operated brake actuator, a first set of hydraulic lines in fluid communication with said first means for affecting pressure, a second set of hydraulic lines in fluid communication with said second means for affecting pressure, a second maser cylinder having third means for affecting pressure upon a fluid working medium, said second master cylinder being operatively connected to said second manually operated brake actuator, a third set of hydraulic lines in fluid communication with said second master cylinder, each of said first, second and third sets of hydraulic lines being mutually independent, a plurality of hydraulic response units, said first second and third sets of hydraulic lines each being in fluid communication with at least some of said hydraulic response units, a pair of front wheel brakes and a pair of rear wheel brakes, each of said wheel brakes having a rotation member and including at least one of said hydraulic response units in fluid communication with said first and second sets of hydraulic lines, at least two wheel brakes being disc brakes having first and second hydraulic response units, said hydraulic response units being floating calipers, each floating caliper having first and second pistons coaxially aligned on opposed sides of the associated rotating member, each first piston being in fluid communication with said first set of hydraulic lines, each second piston of a second caliper being in fluid communication with said third set of hydraulic lines, and each second piston of a first caliper being in fluid communication with said second set of hydraulic lines, whereby fluid pressure variation communicated through any one of said sets of hydraulic lines provides displacement of both pistons of at least one floating caliper of each disc brake, and mechanical means operatively connected to said second manually operated brake actuator for restarting the motion of the rotating members of at least one of said pairs of front and rear wheel brakes, the other of said pair of wheel brakes having hydraulic response units in fluid communication with said third set of hydraulic lines.

2. The brake system of claim 1 wherein at least two of said wheel brakes are drum brakes, each having a hydraulic response unit and at least one brake shoe, said hydraulic response unit being a wheel cylinder having a pair of axially slidable piston members in motion transfer relation with said brake shoe.

3. The brake system of claim 1 wherein said mechanical means is a standard emergency brake operatively connected to said second manually operated brake actuator.

4. A motor vehicle brake system comprising,
a dual master cylinder having first and second mutually independent hydraulic means for affecting pressure upon a fluid working medium,
a first brake actuator operably connected to said dual master cylinder,
a plurality of wheel brakes including a pair of front wheel brakes and a pair of back wheel brakes, each having a rotating member and at least one response unit actuatable by hydraulic pressure of said fluid working medium to retard motion of the rotating member, said first and said second hydraulic means each being in fluid communication with at least one of said response units of each of said wheel brakes, said wheel brakes including at least two disc brakes and said response units of the disc brakes being calipers, each disc brake having first and second calipers, each first caliper having fluid flow paths to said first and second hydraulic means,
an emergency master cylinder having a third hydraulic means for affecting pressure upon a fluid working medium in fluid communication with at least some of said response units, each second caliper of each disc brake having fluid flow paths to said first and third hydraulic means,
mechanical means for restarting the motion of at least some of said rotating members of the wheel brakes including any rotating member not associated with a response unit in fluid communication with said third means for affecting pressure, and
a second brake actuator operably connected to said emergency master cylinder and said mechanical means for retarding said rotating members.

5. The brake system of claim 4 wherein said wheel brakes include at least two drum brakes and said response units of the drum brakes include wheel cylinders having first and second axially movable pistons, said response units having fluid flow paths to said first and second hydraulic means.

6. The brake system of claim 5 wherein said first and second axially movable pistons of the wheel cylinders are spaced apart by a wall, said first axially movable piston being in fluid communication with the first hydraulic means and said second axially movable piston being in fluid communication with the second hydraulic means.

7. The brake system of claim 4 wherein said calipers of said disk brakes are each free-floating relative to said rotating member of the associated wheel brake.

8. A brake system comprising,
a first manually operated brake actuator,
a dual master cylinder operably connected to said first manually operated brake actuator, said dual master cylinder having mutually independent first and second means for generating hydraulic actuating pressures and having first and second outlets for communicating pressurized fluid from said dual master cylinder,
a second manually operated brake actuator independent of said first manually operated brake actuator,
an emergency master cylinder operably connected to said second manually operated brake actuator, said emergency master cylinder having third means for generating hydraulic actuating pressures and having a third outlet for communicating pressurized fluid,
a pair of front wheel brakes, each having a rotating member and at least one hydraulic response unit, each front wheel brake further having a fluid flow path from a hydraulic response unit to said first and said second outlets for communicating pressurized fluid,
a pair of rear wheel brakes, each having a rotating member and at least one hydraulic response unit, each rear wheel brake further having a fluid flow path from a hydraulic response unit to said first and said second outlets for communicating pressurized fluid,
wherein at least two wheel brakes are disc brakes, each having first and second hydraulic response units, said hydraulic response units being calipers, said first caliper having independent flow paths to said first and second outlets of communicating pressurized fluid, said second caliper having independent flow paths to said first and third outlets for communicating pressurized fluid, each caliper being a floating caliper having first and second pistons on opposed sides of the associated rotating member parallel the axis of rotation, said first pistons each operatively responsive to pressure variations at said first outlet, said second pistons of a caliper operatively responsive to pressure variations at the other outlet having a fluid flow path to the respective caliper, each floating caliper providing activation of both the first and the second pistons upon a pressure variation at one piston, and
a mechanical means for retarding the motion of the rotating members of at least one of said front and rear pair of wheel brakes, at least the other of said pair of wheel brakes having a fluid flow path from a hydraulic response unit to said third outlet for communicating pressurized fluid, said mechanical means including a tensioning cable operatively connected to said second manually operated brake actuator.

9. The brake system of claim 8 wherein two wheel brakes are drum brakes having hydraulic response units having fluid flow paths to said first and second outlets for communicating pressurized fluid, said hydraulic response units being wheel cylinders having movable axially opposed first and second pistons.

10. The brake system of claim 9 wherein said first and second pistons of a wheel cylinder are spaced apart by a wall, said first piston being in fluid communication with said first outlet and said second piston being in fluid communication with the second outlet for communicating pressurized fluid.

* * * * *